United States Patent [19]

Geier

[11] 4,254,822
[45] Mar. 10, 1981

[54] BUILDING HEATING SYSTEM, PARTICULARLY UTILIZING SOLAR AND WASTE HEAT RECOVERY

[75] Inventor: Julius D. Geier, Decatur, Ill.

[73] Assignee: Illinois Power Company, Decatur, Ill.

[21] Appl. No.: 963,790

[22] Filed: Nov. 27, 1978

[51] Int. Cl.³ .............................................. F25B 29/00
[52] U.S. Cl. .................................. 165/48 S; 237/2 B; 165/47; 165/29; 165/DIG. 2; 126/428; 126/DIG. 2; 62/275
[58] Field of Search ...................... 237/2 B; 62/2, 150, 62/275, 324 B, 409; 165/47, 48 S, 5 S, 29

[56] References Cited

U.S. PATENT DOCUMENTS

| | | | |
|---|---|---|---|
| 2,133,039 | 10/1938 | Philipp | 62/150 X |
| 2,767,961 | 10/1956 | Frankland | 165/53 X |
| 2,896,428 | 7/1959 | Paton | 165/48 X |
| 3,263,438 | 8/1966 | Maudlin | 165/53 X |
| 3,989,098 | 11/1976 | Takasaki | 165/48 |
| 3,995,809 | 12/1976 | Karlsson | 237/2 B |
| 4,103,493 | 8/1978 | Schoenfelder | 62/2 X |
| 4,141,490 | 2/1979 | Franchina | 237/2 B |
| 4,143,815 | 3/1979 | Meysenberg | 237/2 B |
| 4,190,199 | 2/1980 | Cawley et al. | 62/2 X |

Primary Examiner—Henry C. Yuen
Assistant Examiner—Henry Bennett
Attorney, Agent, or Firm—Charles F. Pigott, Jr.; Garrettson Ellis

[57] ABSTRACT

A building heating system includes a plenum for distributing heated air and returning cool air to the heater. In accordance with this invention, additional heat pump means are provided comprising condenser or heat rejecter means positioned in the cold air plenum, heat absorber means which are preferably positioned in the attic of the building underneath the roof and/or in heat exchange relation with warmed gases from a chimney, and conduit and compressor means for providing heat transfer flow communication therebetween.

6 Claims, 8 Drawing Figures

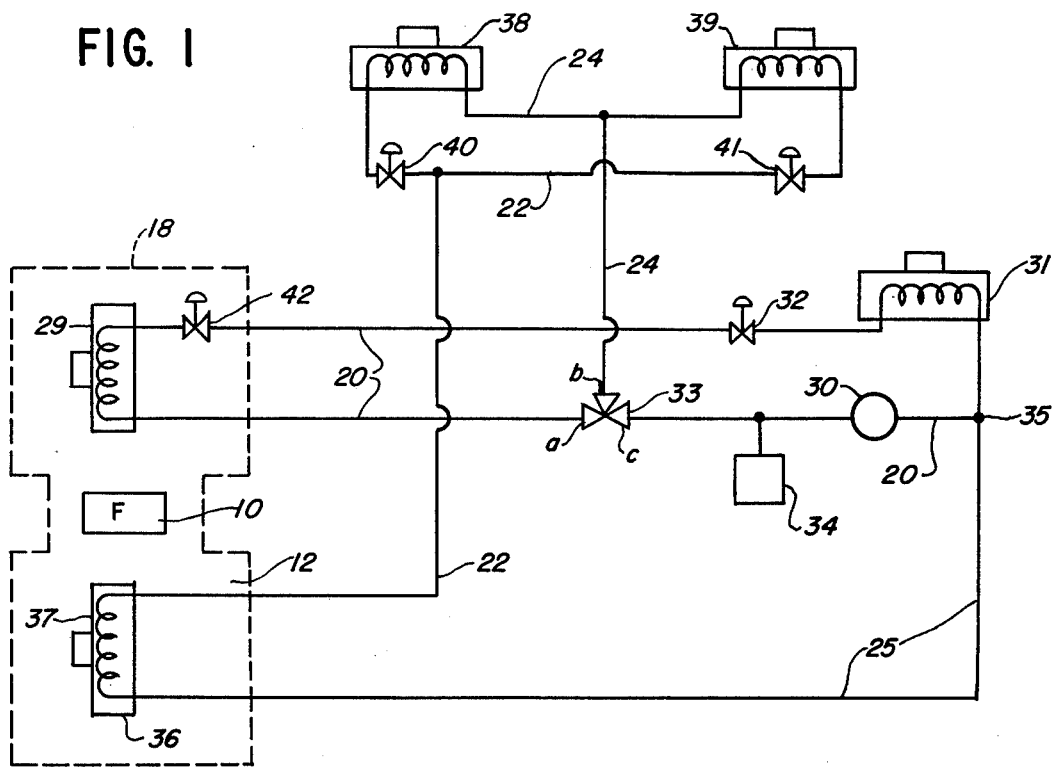
FIG. 1
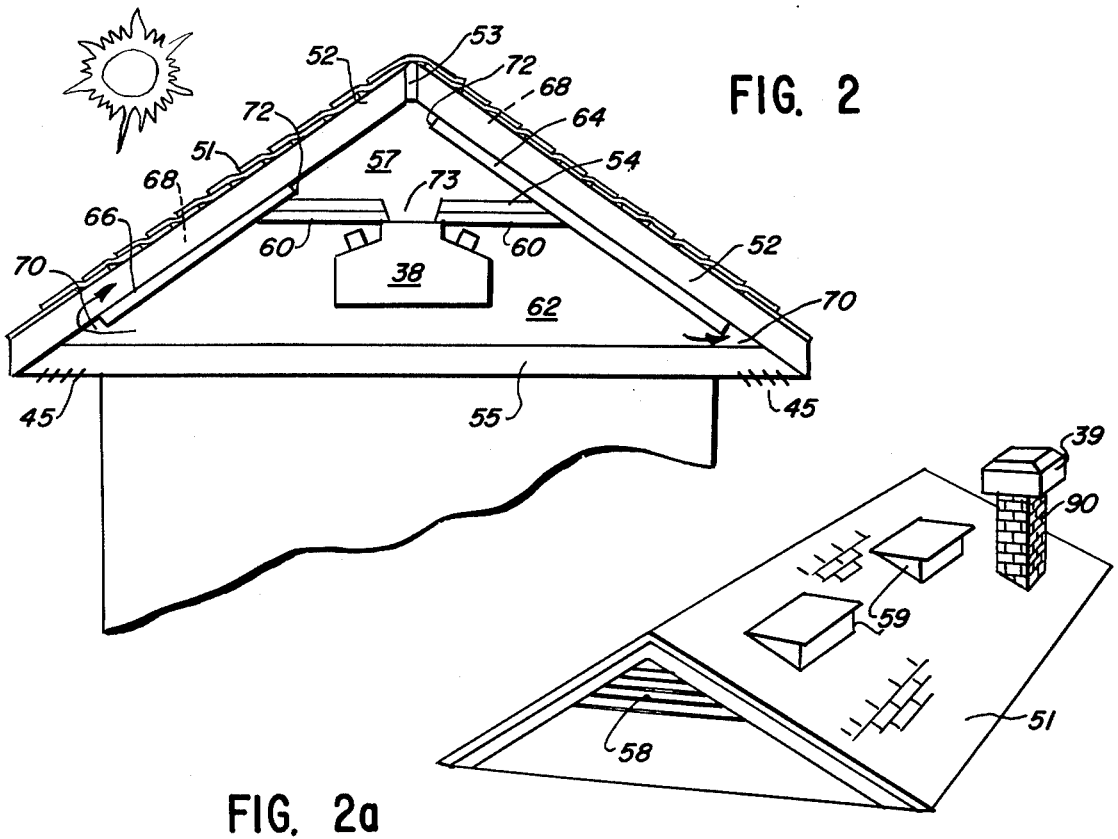
FIG. 2
FIG. 2a

BUILDING HEATING SYSTEM, PARTICULARLY UTILIZING SOLAR AND WASTE HEAT RECOVERY

BACKGROUND OF THE INVENTION

This application relates to a building heating system in which a major portion of the heat may be supplied by a heat pump, so that a relatively reduced percentage of the heat load is required to be provided by a furnace which burns fossil fuel or provides heat through the direct conversion of electricity.

Heat pumps are, of course, well known in the heating and air conditioning field. Basically, in a heat pump system, a first heat exchange member is positioned within the heating system of a building, while a second heat exchange member is positioned outside of the building. Conduit and compressor means communicate with the two heat exchange members. Depending upon the specifically arranged flow pattern between the two heat exchange members, heat can be absorbed in one of them and emitted or rejected in the other of them, so that the heat pump becomes either a home heater, drawing heat from the outside, or an air conditioner, rejecting heat to the outside.

It would be desirable to place one of the heat exchangers of a heat pump system into or adjacent to the cold air plenum of a conventional forced air furnace system. With this configuration, it becomes possible to pump heat from the heat exchanger into the warm air plenum in series or parallel relation to the normal furnace air flow, with efficient heat exchange relationship, while simultaneously operating the furnace to provide necessary auxiliary heat.

However, under the circumstance when the heat pump is in the air conditioning mode, the condensation from the heat pump in the cold air plenum will send a stream of wet air onto the heat exchanger of the furnace, which, in turn, will accelerate its rusting in a most undersirable manner.

Accordingly, by way of compromise, conventional heat exchangers of heat pump systems are placed downstream from the furnace in the warm air plenum. This means that the heat pump and the furnace cannot operate simultaneously to heat the building with good efficiency, since warmed air from the furnace passes over the heat exchanger and accordingly reduces the amount of heat emitted by the heat exchanger.

It is further known that there are unexploited sources of heat in a building, particularly, the waste heat that passes up a chimney from, for example, the furnace, plus the considerable amount of heat that is generated in the attic of a building, for example, on a sunny, winter day.

While it has been previously suggested to place a heat pump evaporator in the attic of a house (Gay U.S. Pat. No. 2,780,415), and while a chimney flue and the like has been contemplated as a source of heat (Ruff U.S. Pat. No. 2,696,085), efficient systems for the exploitation of these heat sources have not been previously developed.

In accordance with this invention, a heating system is provided in which waste heat which is normally exhausted through the chimney and/or solar heat collected in an attic structure of a building, can be recovered with a relatively high level of efficiency. Furthermore, the heat pump system of this invention can operate in conjunction and simultaneously with a furnace with good efficiency, and without the disadvantage that was previously encountered in heat pump systems, so that the operation of the furnace can be minimized to save the consumption of fossil fuel or the like. Hence, the furnace can act as an auxiliary source of heat at night or at other times when the heat pump system is inadequate to provide all necessary warmth.

DESCRIPTION OF THE INVENTION

In accordance with this invention, a building heating system is provided which includes a plenum system for distributing heated air from a heater through a warm air plenum, and for returning cool air to the heater through a cold air plenum.

In accordance with this invention, additional heat pump means are provided comprising heat rejecter means positioned in the cold air plenum, for improved efficiency of heating. Heat absorber means are also provided, as well as conduit and compressor means providing heat transfer flow communication therebetween.

Preferably, the heat absorber means will be positioned directly under the roof of a building. Specifically, for a building having a gable-type roof and rafters, partition means are attached to the rafters to define a flow plenum extending the length of and underneath said roof between the gable ends. The partition means also defines parallel flow channels between the rafters, with the flow channels being open at both ends so that the upper ends of the flow channels communicate with the flow plenum and the lower ends of the flow channels communicate with an open space below the flow plenum. The heat absorber means includes fan means, and is positioned to pass air between the flow plenum and the open space. As a result of this, air can circulate through the flow channels, the flow plenum and the open space, while heat is absorbed by the absorber means.

The resulting structure provides an enclosed area of flow channels which run immediately underneath the roof. Accordingly, sunlight impinging upon the roof causes heat to flow inwardly by conduction, warming the air which is passing through the flow channels between the rafters. The air is warmed to a greater degree, because it is isolated by the partition means from the larger mass of air in, for example, the open space.

Additionally, this invention relates to a building heating system having heat pump means which includes heat absorber means positioned in heat exchange contact with warm gases of a chimney on the building. Preferably, the heat absorber coils are annular in shape, and positioned about the chimney, with an annular collection pan underneath, and having radiant heat or other type defrosting units for the annular coil.

Referring to the drawings, FIG. 1 is a diagramatic view of a heating and air conditioning circuit for a building such as a house.

FIG. 2 is a transverse sectional view of the upper portion of a house with a gable roof, utilizing the invention of this application.

FIG. 2a is a perspective view of the roof of FIG. 2.

FIG. 4 is a transverse sectional view of the heat absorber unit mounted on the chimney as shown in FIG. 2a.

Figure 3:
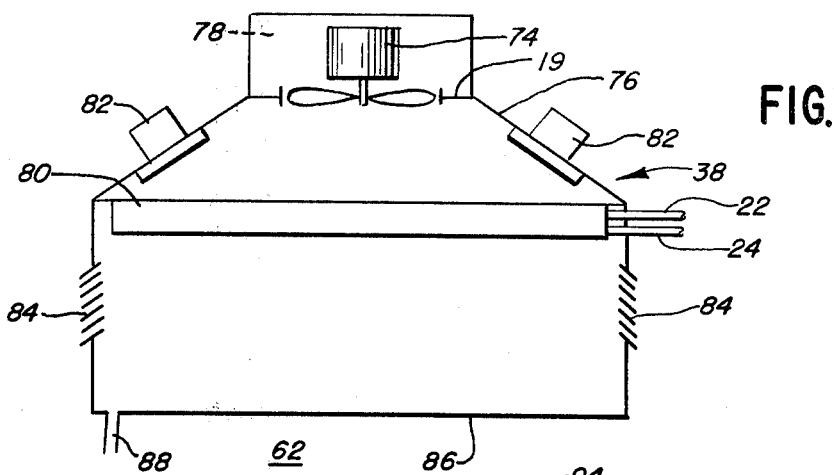
FIG. 3 is a transverse sectional view of the heat absorber means positioned directly underneath the roof as shown in FIG. 2.

Referring to FIG. 1, a modification is disclosed of a standard home central air conditioning and heating system which may include a heat pump. This particular embodiment requires only a minimum of modification of standard equipment, and thus is suitable as an add-on system for a system which has already been installed in a home.

Furnace 10 may be a fossil fuel or electric furnace, in heat exchange flow relationship with forced air passing through a plenum system. Cold air plenum 12 is shown diagramatically providing input air to furnace 10, while warm air plenum 18 receives the output air from the furnace and distributes it to the house.

As is conventional, warm air plenum 18 encloses a heat exchange member 29 of a conventional heat pump or central air conditioning system. Member 29 may be the evaporator or heat absorber in the air conditioning mode, and the condenser or heat rejecter in the heating mode. Conduit system 20 provides refrigerant flow communication between heat exchange member 29 and the second heat exchange member 31, which is alternately the condenser or heat rejecter when member 29 is the evaporator (in the air conditioning mode). Alternatively, member 31 may be the evaporator in the heating mode or the condenser of a central air conditioning system, while member 29 is the condenser or heat rejecter. For a central air conditioning system, member 29 is the evaporator.

Compressor 30 is also provided for operating the heat pump or central air conditioning system defined by members 20, 29 and 31.

The above-described system is, however, optional for the purposes of this invention. The heat pump system described above is primarily used for air conditioning purposes in the system of FIG. 1.

In accordance with this invention, an additional heat pump system is provided. The condenser or heat rejecter means 36 of this invention may be a condenser coil residing within the cold air plenum 12. A booster fan 37, operating in conjunction with the furnace fan, blows air to be heated across coil 36 for absorbing heat from the coil. The flow of air across coil 36 may be either in series or parallel with the flow of air through the furnace.

Refrigerant flows through conduit system 22 upwardly to an area adjacent the roof of the building. Conduit 22 communicates through expansion valves 40 and 41 to heat absorber means 38, 39, which may be heat exchange coils for drawing heat from the ambient air for transfer to heat rejecter means 36. Optionally, one of heat absorber means 38 or 39 may be omitted.

Heat absorber 38 may be positioned directly underneath the roof of the building as shown in FIG. 2. Heat absorber 39 may be mounted on the chimney of the building in accordance with FIG. 4 for heat exchange communication with the stream of hot gases passing upwardly out of the chimney from, for example, the furnace.

The refrigerant then passes down conduit 24 to three-way valve 33, and from there to compressor 30 for recirculation through line 25 to heat rejecter 36.

Further in accordance with this invention, three-way valve 33 is automatically positioned to permit flow through either the b-c or the a-c leg. In the former condition, flow circulation can take place between heat absorbers 38, 39 and heat rejecter 36. In the latter position, circulation of refrigerant can take place between heat exchangers 29 and 31.

Additionally, solenoid valve 32 is adapted to be closed automatically by conventional means when the heating mode for the system is selected, the three-way valve being then automatically positioned for flow through the b-c leg only.

T-connection 35 between lines 20 and 25 is also provided as shown.

Expansion valve 42 is positioned in line 20 for providing the desired heat exchange characteristics of the system.

Accordingly, when air conditioning is desired, three-way valve 33 is positioned so that it is open along line a-c and closed along line b-c. No flow takes place in lines 22, 24, while free circulation takes place through line 20 between heat exchange members 29, 31, powered by compressor 30, for the absorption of heat through heat exchanger 29 and its rejection at heat exchanger 31.

In the heating mode of the system, three-way valve 33 is turned to open path b-c and close path a-c. Then, flow can no longer take place in the circuit defined by line 20, while the flow is opened through lines 22, 24, and 25, powered by compressor 30. During the day, when the sun is shining on the roof of the house, the heat may be picked up by heat absorber means 38 so that heated fluid is circulated through heat rejector 36.

Accumulator 34 is provided for refrigerant inventory control. It supplies the refrigerant which condenses in heat exchanger 31 in the heating mode, and also provides storage capacity for refrigerant when the system is operating in the cooling mode when heat exchanger 31 is active.

Because heat rejecter 36 is upstream from the furnace, which may be operating during the heating mode in this embodiment, the differential between the warm coils of heat rejecter 36 and the cool air in the plenum is maximized for a maximum heating efficiency. Any additional heat then necessary may be provided by the furnace. An automatic thermostat system may be provided which will activate the furnace at a temperature one or two degrees below the thermostat setting for the heat pump system utilizing heat exchangers 36, 38 and conduits 22, 24 and 25.

Heat absorber 39 is also positioned in this system, and is operative to extract flue gas heat from the chimney, for example, recycling heat which has been emitted from furnace 10.

Referring to FIGS. 2 and 2a, a typical attic structure modification to incorporate heat absorber 38 is shown. A conventional roof construction 51 may be utilized, including a sandwich of shingles, felt, and sheathing attached to rafters 52, ridge rafter 53, collar ties 54, and floor joists 55.

In accordance with this invention, sheathing or partition means are provided to define an upper plenum 57 which runs the full length of the roof between the gable ends. Pressure closing louvers 58 are provided in the gable ends, plus other pressure closing louvers 59 positioned on the roof 51. These louvers may open outwardly, so that they close when a slight suction pressure exists under roof 51, but open when a slight overpressure exists. Also, the louvers may be openable, if desired, when the outside air is warm.

Horizontal sheathing or partition 60 is provided to define a lower wall, to separate flow plenum 57 from open space 62 below sheathing or partition 60. Similarly, additional sheathing or partitions 64, 66 are attached to the lower portions of rafters 52 to define enclosed flow channels 68 between the respective rafters, which flow channels are open at their respective ends 70, 72. The upper end 72 of the flow channels 68 communicate with flow plenum 57, while the lower open ends 70 commincate with open space 62.

Heat absorber means 38, also shown in the flow diagram of FIG. 1, may be positioned to occlude aperture 73 in partition 60 communicating between plenum 57 and space 62.

Accordingly, heat absorber 38, which is equipped with a two-way fan 74 (FIG. 3), or a one-way fan with appropriate louvers, is able to blow air from plenum 57 to space 62, or in the opposite direction. Heat absorber 38 operates to absorb heat while it circulates air in a circuit including plenum 57, open space 62, and flow channels 68 between rafters 52 which communicate with the respective spaces 57, 62.

During the daytime, when the sun is shining on the roof, the fan 74 of heat absorber 38 may operate to blow air downwardly from flow plenum 57 to open space 62. Accordingly, air is impelled upwardly through flow channels 68, between the rafters, entering at ends 70 and exiting at ends 72, being warmed by the warm roof during the passage. Then the warmed air enters plenum 57 for passage through heat absorber 38.

At night the roof becomes cool. The flow of air may then be reversed by reversing fan 74 so that relatively warm air from open space 62 is impelled upwardly into plenum 57. In this instance, cooled air pushed into plenum 57 may be partially expelled through louvers 58, 59. Under this circumstance, open space 62 may tend to have more heat than plenum 57, due to conduction of heat from the house, which is recovered by reversing fan 74.

The fan reversal may be automatically controlled by conventional means for detecting a differential in the air temperature between plenum 57 and the outside air coupled with an automatic motor power circuit control. This may take place automatically during the day, depending upon the amount of solar energy impacting upon the roof and the difference in temperatures between the outside air and the attic or plenum 7. Alternatively, a temperature sensor may be placed in open space 62. Such an automatic control of the fan reversal may be affected by the rate of heat removal by the evaporator 38 as the refrigerant carries the heat away.

Accordingly, heat trapped in the upper portion of the house may be collected by heat absorber 38 and passed by heat rejecter 36 into the central air circulation system of the building for warming, without need for burning of fossil fuels.

It should be noted that partition means 66 are generally shorter than partition means 64. The choice of lengths of the respective partitions along the rafters will depend upon the individual situation, and will be particularly influenced by the position of the roof with respect to the path and angle of the sun. In the specific instance shown, the side of the roof which carries partition 66 receives much more radiation from the sun than the shady side of the roof which carries partition 64.

Accordingly, lengthening of partition 64 tends to increase the flow resistance through flow channels 68 with respect to the flow resistance to the flow channels defined by partition 66. Accordingly, the air passing over partition 64 moves more slowly than the air passing over partition 66, so that both streams of air may be heated approximately equally, thus compensating for the differences in solar radiation received on the two sides of roof 51. The lengths of the respective partitions 64, 66 may be adjusted so that the respective flows through the channels 68 provide a maximum amount of heat extraction from the sun-warmed roof 51. It may also be desirable to seal off some of the coolest channels 68, in which case the partitions below horizontal partition 60 for those channels are not needed.

The material of partition or sheathing 64, 66 may be of any common material used for construction such as rigid panels, bats or rolls or construction material, or plywood. Preferably, partitions 60, 64, 66 should exhibit some insulating properties to permit a differential in air temperature on opposite sides thereof.

Evaporator or heat absorber 38 is preferably sealed to partition 60 so that fan 74 can operate with no bypass leakage.

FIG. 3 shows an enlarged, detailed view of heat absorber 38. Housing 76 encloses fan 74 and defines an upper aperture 78, which communicates with flow plenum 57. Heat absorbing coils 80 are positioned as shown within housing 76, being positioned in flow communication with inlet and outlet lines 22, 24 (FIG. 1).

Auxiliary heating devices 82 may constitute heat lamps, resistance heaters, or the like, to remove frozen condensation from heat absorbing coils 80. They may operate on a timed energization cycle if desired. They may also be actuated by high differential pressure across the coils.

Vents 84 are positioned in flow communication with open space 62 to permit the free passage of air through heat absorbing member 38.

Collector pan 86 is provided to receive liquid condensate falling from heat absorbing coil 80, being drained by tube 88, which may connect to the nearest plumbing vent stack which normally goes through the attic to vent sewer gases to the outside air.

Turning to heat absorber 39, which is located on chimney 90 (FIG. 4), the heat absorber includes a housing 92, which is attached to chimney 90 and defines an open but preferably constricted vent 94 for venting chimney gases. Accordingly, when the chimney is operating, the interior of housing 92 is relatively warm.

Heat absorbing coil 96 is positioned within housing 92, and is of annular shape, surrounding chimney 90. Coil 96 communicates, as shown in FIG. 1, with lines 22, 24 for heat exchange flow communication with heat rejecter 36.

Annular drip pan 100 is also provided, with drain tube 102 communicating with the plumbing vent stack or some other means for removing liquid condensate received from coil 96.

Accordingly, as warm air is sent up the chimney 90, the interior of housing 92 is warmed in turn, permitting the absorption of waste heat into heat absorber coil 96 for transmittal back to the heating system of the building.

Safety bypass openings 104 may be provided in the base of housing 92, to permit the escape of chimney gases in case the evaporator coils become plugged with debris or ice.

The defroster members 98, which may be resistance heating coils or electric heat lamps, may be energized by a defrost controller at a remote location, adapted for simultaneous control of the compressor interlocks, which may be of conventional construction. The compressor may be shut off and the fan operated during the defrost cycle. The defrosters are of course energized at the same time. During normal heat pump operation, the defrosters are kept off by an interlock to prevent simultaneous operation with the compressor. For heat absorbers 38, 39 conventional defrost cycles by automatic refrigerant reversals are also possible.

Figure 5:
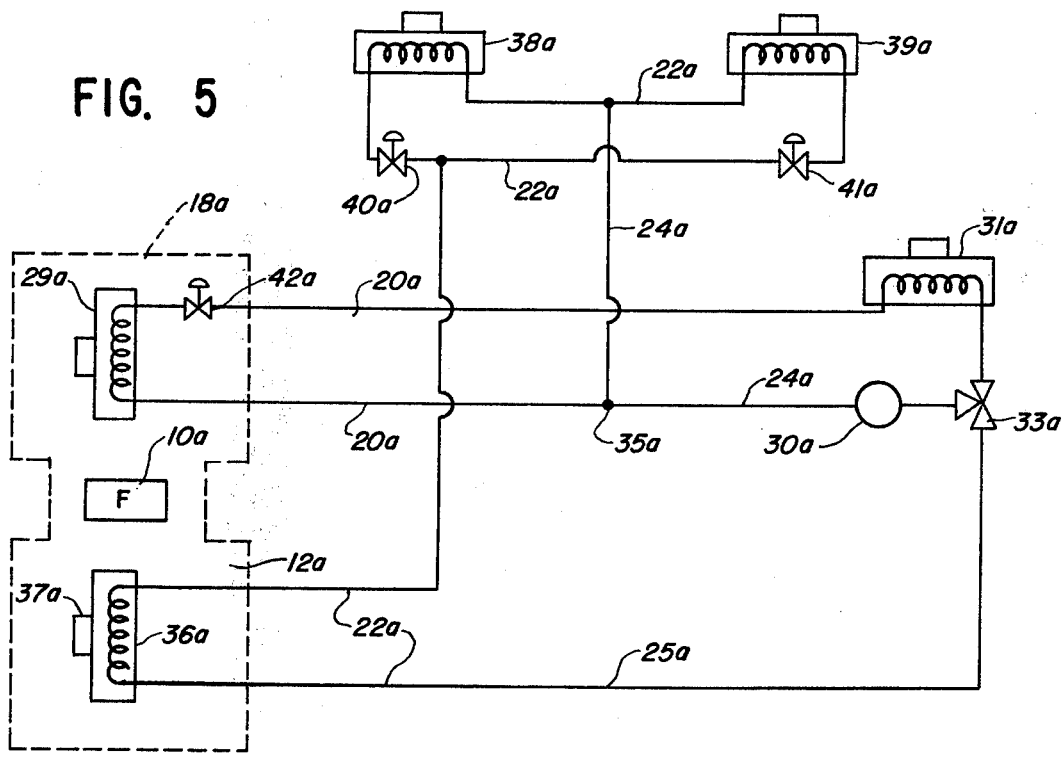
FIGS. 5, 6 and 7 are diagramatic views of alternate heating and air conditioning systems which may be utilized in accordance with this invention.

Referring now to FIG. 5, a structure which is similar to that shown in FIG. 1 is disclosed, except as otherwise indicated herein. Furnace 10a is disclosed, along with cold air plenum 12a and warm air plenum 18a, of the forced air distribution system throughout the house, functioning in a manner similar to that described with respect to FIG. 1.

A conventional heat pump system has a heat exchange member 29a, similar to member 29 of FIG. 1, with conduits 20a providing communication with heat exchange member 13a located outside of the house.

Figure 4:
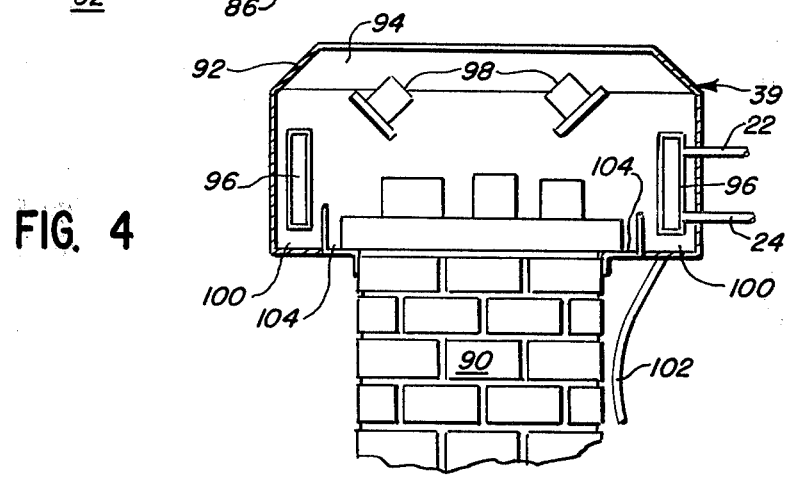

In accordance with this invention, heat rejecter 36a having fan 37a is located within or adjacent to the cold return air plenum 12a, and communicates by lines 22a, 24a, 25a, to define a circuit with heat absorber 38a positioned underneath the roof in the manner similar to that shown in FIG. 2, as well as heat absorber 39a, positioned on the chimney as shown in FIG. 4.

Expansion valves 40a, 41a provide the function similar to that previously disclosed, as does compressor 30a.

In this specific embodiment, the location of three-way valve 33a and T-connection 35a are reversed, which makes possible the elimination of accumulator 34.

In the cooling mode, three-way valve 33a is adapted so that the flow from compressor 30a passes through heat rejecter 31a, then passing through expansion valve 42a to heat absorber 29a in the output plenum 18a of the forced air system.

In the heating mode, three-way valve 33a shuts off flow to member 31a and provides flow through lines 24a, 25a, heat rejecter 36a, and then upwardly to the roof of the house through line 22a to heat absorption members 38a, 39a.

The arrangement of FIG. 5 may be used in those cases where physical space limitations of the outside packaged unit consisting of compressor 30a and heat exchange unit 31a make this arrangement preferable. This arrangement is particularly believed to be preferred for new construction, while the arrangement of FIG. 1 may be particularly desirable for an add-on of old construction.

Figure 6:
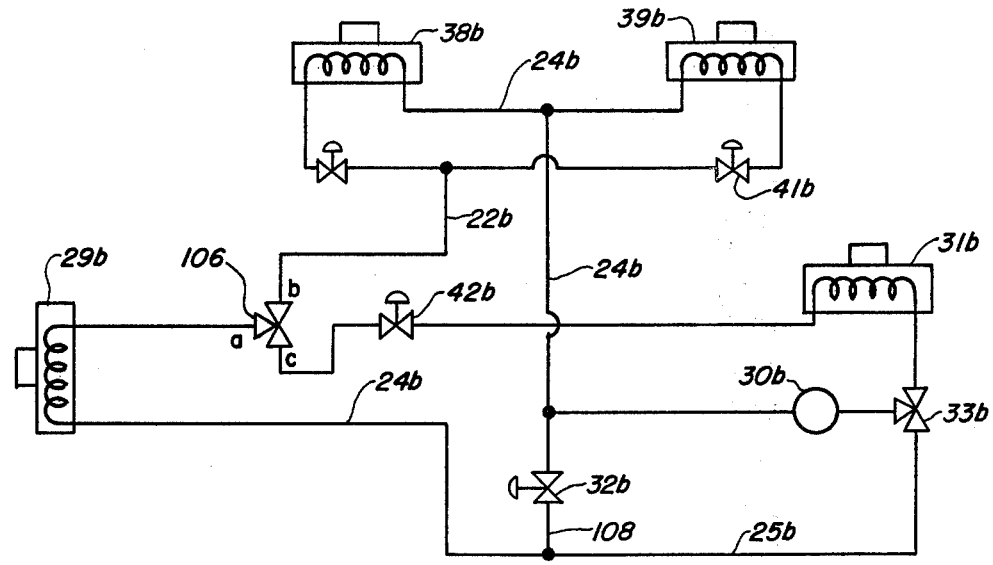

Turning to FIG. 6, the diagram is similar to the system of FIG. 1, except as otherwise indicated herein.

The conventional installation includes compressor 30b and condenser/evaporator 31b, generally for installation outside of the house. Evaporator/condenser 29b, and also expansion valve 42b, if desired, are positioned in the furnace warm air plenum, and serve for both heating and air conditioning when the furnace is off, or, alternatively, if there is no furnace.

Evaporators and heat absorbers 38b and 39b may be positioned in a manner identical to their counterparts 38, 39 and FIG. 1, along with expansion valves 40b, 41b and the conduits 22b, 24b.

Automatic three-way valve 106 is provided, along with three-way valve 33b and solenoid valve 32b which latter two items find their counterpart in the circuit of FIG. 1.

The system disclosed in FIG. 6 operates as follows: high pressure refrigerant leaves compressor 30b and, in the heating mode, is directed by three-way valve 33 downwardly into line 25b for transport to heat exchanger 29b, which thus functions as a condenser or heat rejecter. Solenoid valve 32b may be automatically closed in the heating mode.

The refrigerant then flows through three-way valve 106 through path a-b along conduit 22b to the heat absorbers or evaporators 38b, 39b, through their respective expansion valves 40b, 41b.

Heat is absorbed in this manner from the attic air and the chimney flue gases or outside air in these units as described previously, and the refrigerant then returns to the compressor 30b through line 24b for recycling.

In the air conditioning mode, compressor 30b discharges refrigerant through valve 33b, which is set to direct the refrigerant through condenser 31b. The refrigerant then flows through expansion valve 42b, and through path c-a of three-way valve 106 to heat exchanger 29b, which operates in this instance as an evaporator. There, the heat is absorbed from the furnace air, and the refrigerant flows back through line 24b and then through line 108 and open solenoid valve 32b for recirculation again through compressor 30b.

Figure 7:
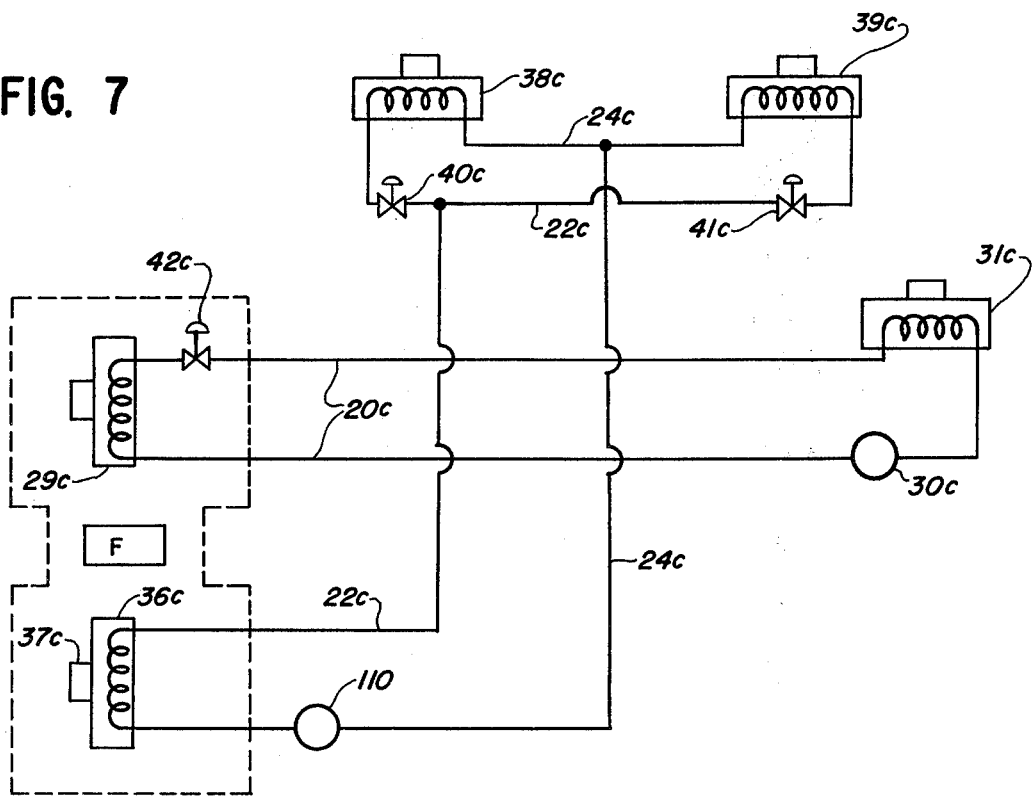

Referring to FIG. 7, an embodiment of this invention is shown where essentially two separate systems exist. This system is particularly suitable for an add-on situation, where a heat pump system already exists in the building.

The conventional system comprises a pair of heat exchange members 29c, 31c similar to members 29, 31 of FIG. 1. Compressor 30c and expansion valve 42c similarly operate, along with conduit 20c, in conventional manner to provide a normal heat pump circuit.

Added to this as a separate system is the device of this invention in which added condenser 36c with fan 37c communicates by means of conduits 22c, 24c in a circuit with evaporators 38c, 39c positioned in a manner similar to their counterparts in FIG. 1, plus expansion valves 40c, 41c. Added compressor 110 is provided in line 24c, since the systems are separate. This sort of system is accordingly desirable for an add-on situation when the compressor presently installed in the building is inadequate to operate the entire system.

In the heating mode, the conventional, installed components may operate either as a heat pump, or, alternatively, members 29c, 31c and related parts may be replaced with a conventional electric or fossil fuel furnace. Condenser 36c is preferably located as before in the cold air plenum so that heat may be transferred from the attic and/or chimney to the furnace air, with the system functioning as previously described.

In all of the above specific embodiments of circuitry, automatic conventional controls may be provided for preferential selection and sequencing of component operations. The systems are preferably designed to operate the heating system such that the first-on components are those which are necessary to obtain heat exclusively from the attic and chimney units 38, 39.

The control system senses the preselected turn-on point when the supplemental electric or fossil-fired heating is to be added. Conventional interlock control components may be selected for a system design to prevent undesired simultaneous operations of heating and cooling systems, or the parts of the systems which may conflict with the optimum system performance. In most cases, the latter installation would be important when applying this invention as an add-on system, where the originally installed system already has restrictions which prevent simultaneous heat pump and supplemental fossil fuel or electric heating operations.

The above has been offered for illustrative purposes only, and is not intended to limit the invention of this application, which is as defined in the claims below.

That which is claimed is:

1. In a central, forced-air building heating system which includes a plenum system for distributing heated air from a furnace in a warm air plenum, and for returning cool air to the furnace in a cold air plenum, the improvement comprising:

first heat pump means comprising heat rejector means positioned to directly communicate with said cold air plenum, said heat rejector means being located upstream of an in series with said furnace, heat absorber means, and conduit and compressor means providing heat transfer flow communication therebetween, second heat pump means having heat exchange means directly communicating with said warm air plenum and located downstream of said furnace, said building defining a gable roof and rafters, and partition means attached to said rafters to define a flow plenum extending the length of said roof between gable ends plus parallel, enclosed flow channels between said rafters, said flow channels being open at both ends, the upper ends of said flow channels communicating with said flow plenum and the lower ends of said flow channels communicating with an open space below said flow plenum, said heat absorber means defining fan means, and being positioned to exchange heat with and to pass air between said flow plenum and said open space, whereby air can circulate through said flow channels, flow plenum and open space while its heat is absorbed by said heat absorber means, said building roof defining a generally sunward side and a shady side, said partition means defining said flow channels on the shady side of said roof which are longer than the flow channels defined by said partition means on the generally sunward side of said roof, whereby greater air flow passes through the flow channels under the generally sunward side of the roof than through the flow channels of the generally shady side of the roof.

2. The heating system of claim 1 in which said heat absorber means is positioned directly under the roof of said building.

3. The heating system of claim 1 in which the conduit in which heat exchange fluid passes from said heat absorber means passes through a compressor and a three-way valve prior to communicating with said heat rejecter means, said three-way valve providing selective flow communication with said second heat pump means.

4. In a central, forced-air building heat system which includes a plenum system for distributing heated air from a furnace in a warm air plenum, and for returning cold air to the furnace in a cold air plenum, the improvement comprising:

heat pump means comprising heat rejecter means positioned to directly communicate with said cold air plenum, said heat rejecter means being located upstream of and in series with said furnace, said heat pump means also including heat exchanger means positioned adjacent the roof of said building, said roof defining rafters and partition means to define parallel, enclosed flow channels between said rafters, and means to pump air through said flow channels and then across said heat exhanger means, in which said building roof defines a generally sunward side and a shady side, said partition means defining said flow channels on the shady side of said roof being longer than the partition means defining said flow channels on the generally sunward side of said roof, whereby greater air passes through the flow channels under the generally sunward side of the roof than through the flow channels of the generally shady side of the roof.

5. The heating system of claim 4 in which said heat absorber means include defroster heater means for removing frozen condensation from said heat absorber means.

6. The building heating system of claim 4 in which second heat absorber means are positioned directly communicating with the warm air plenum and located downstream of and in series with said furnace to provide cooling of said building when said heat pump means is operated in a cooling mode, in which circumstance the heat exchanger means positioned adjacent the roof functions as the heat rejector means.

* * * * *